US007984295B2

(12) United States Patent
Oh et al.

(10) Patent No.: US 7,984,295 B2
(45) Date of Patent: Jul. 19, 2011

(54) METHOD AND APPARATUS FOR TRANSMITTING MESSAGE TO WIRELESS DEVICES THAT ARE CLASSIFIED INTO GROUPS

(75) Inventors: Seung-jae Oh, Seoul (KR); Sung-min Lee, Suwon-si (KR); Se-hee Han, Seoul (KR); Hyun-gyoo Yook, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

(21) Appl. No.: 11/645,595

(22) Filed: Dec. 27, 2006

(65) Prior Publication Data

US 2007/0150720 A1 Jun. 28, 2007

(30) Foreign Application Priority Data

Dec. 27, 2005 (KR) .................. 10-2005-0130609

(51) Int. Cl.
*H04L 9/32* (2006.01)
(52) U.S. Cl. ..................................... 713/168; 713/163
(58) Field of Classification Search .................. 713/168
See application file for complete search history.

(56) References Cited

U.S. PATENT DOCUMENTS

| 5,748,736 A * | 5/1998 | Mittra ........................... 713/163 |
| 2003/0044020 A1 | 3/2003 | Aboba et al. |
| 2005/0120216 A1 | 6/2005 | Lee et al. |
| 2006/0045271 A1 | 3/2006 | Helbig et al. |

FOREIGN PATENT DOCUMENTS

| EP | 1603047 A1 | 12/2005 |
| JP | 11-122681 A | 4/1999 |
| JP | 2004-056325 A | 2/2006 |
| KR | 10-2005-0033628 A | 4/2005 |
| KR | 10-2006-0058789 A | 6/2006 |
| WO | 0024175 A1 | 4/2000 |

OTHER PUBLICATIONS

Microsoft, "Universal Plug and Play Device Architecture", Jun. 8, 2000, Version 1.0, p. 15.*
He et al. Analysis of the 802.11i 4-Way Handshake, Stanford University Electrical Engineering and Computer Science Departments, Oct. 1, 2004, Stanford, California.

* cited by examiner

*Primary Examiner* — Gilberto Barron, Jr.
*Assistant Examiner* — Cordelia Zecher
(74) *Attorney, Agent, or Firm* — Sughrue Mion, PLLC

(57) ABSTRACT

A method and an apparatus for transmitting a message to a plurality of wireless devices that are classified into units of groups are provided. The method includes operations of: (a) determining whether the message is a predetermined message for detecting a device in a network; (b) encrypting the message with one of a plurality of keys respectively corresponding to a plurality of groups according to a determination result obtained in operation (a), each group comprising one or more devices in the network; and (c) transmitting the encrypted message. Accordingly, it is possible to prevent a guest wireless device that is unknown to a user from detecting a home wireless device of the user and controlling the detected home wireless device without authorization from the user.

21 Claims, 8 Drawing Sheets

METHOD AND APPARATUS FOR TRANSMITTING MESSAGE TO WIRELESS DEVICES THAT ARE CLASSIFIED INTO GROUPS

CROSS-REFERENCE TO RELATED PATENT APPLICATION

This application claims priority from Korean Patent Application No. 10-2005-0130609, filed on Dec. 27, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to transmitting a message to a plurality of wireless devices that are classified into groups.

2. Description of the Related Art

Wireless devices in a wireless home network wirelessly transmit messages. Accordingly, wireless devices or access points (AP) using the same channel can receive messages from one another. Sometimes, however, a wireless device needs to transmit a message to only a specific wireless device.

The Institute of Electrical and Electronics Engineers (IEEE) 802.11i standard defines various message security methods. In particular, according to the Wi-Fi Protected Access-Pre-Shared Key (WPA-PSK) standard, which is a version of the IEEE 802.11i standard for home networks or small office/home office (SOHO) environments, when a wireless device communicates one-on-one with an AP using a unicast method, messages transmitted between the wireless device and the AP can be encrypted with a pairwise key which is shared only between the wireless device and the AP. In order to transmit a message to a plurality of wireless devices, the message may be encrypted with a group key corresponding to a group into which the plurality of wireless devices are classified.

FIG. 1 is a diagram illustrating a related art method of unicasting a message encrypted according to the IEEE 802.11i standard. Referring to FIG. 1, a first wireless device 11 encrypts a message with a first pairwise key PK1 and transmits the message encrypted with the first pairwise key PK1 to an AP 1. The AP 1 receives the message encrypted with the first pairwise key PK1 from the first wireless device 11 and decrypts the received message with the first pairwise key PK1, thereby restoring the original message. The AP 1 encrypts the restored message with a second pairwise key PK2 and transmits the message encrypted with the second pairwise key PK2 to a second wireless device 12. The second wireless device 12 which holds the second pairwise key PK2 can decrypt the message encrypted with the second pairwise key PK2. Wireless devices which do not hold the second pairwise key PK2 cannot decrypt a message encrypted with the second pairwise key PK2 even if they receive a message encrypted with the second pairwise key PK2.

FIG. 2 is a diagram illustrating a related art method of multicasting a message encrypted according to the IEEE 802.11i standard. Referring to FIG. 2, a first wireless device 21 encrypts a message with a group key GK allocated to a group to which the first wireless device 21 belongs, and transmits the message encrypted with the group key GK to an AP 2. The AP 2 receives the message encrypted with the group key GK from the first wireless device 21 and transmits the received message as it is. Then any wireless device that holds the group key GK can decrypt the message transmitted by the AP 2, whereas wireless devices that do not hold the group key GK cannot decrypt the message transmitted by the AP 2.

Recently, wireless home networks are becoming more widespread due to their reduced costs and higher speeds. Wireless devices can be readily connected to wireless home networks without additional installation operations, and thus, wireless home networks are expected to be commonplace in home networking in the near future. However, wireless devices which are unknown to a user of a wireless home network can be connected to the wireless home network of the user. In particular, in a Universal Plug and Play (UPnP)-based wireless home network environment, a wireless device which is unknown to a user may find a wireless device of the user and control the detected wireless device without authorization from the user.

According to the IEEE 802.11i standard, the encryption of messages is conducted on a data link layer. However, according to the UPnP standard, the detection of a wireless device is conducted on an application layer. Therefore, related art IEEE 802.11i-based methods of encrypting messages cannot prevent a wireless device which is unknown to a user from finding a wireless device of the user in a UPnP-based wireless home network environment and controlling the detected wireless device without authorization from the user.

SUMMARY OF THE INVENTION

The present invention provides a method and an apparatus for preventing a wireless device which is unknown to a user from finding a wireless device of the user in a wireless home network environment and controlling the detected wireless device without authorization from the user.

The present invention also provides a computer-readable recording medium that stores a computer program for executing the method of preventing a wireless device which is unknown to a user from finding a wireless device of the user in a wireless home network environment and controlling the detected wireless device without authorization from the user.

According to an aspect of the present invention, there is provided a method of transmitting a message. The method includes operations of: (a) determining whether the message is a message for detecting a device in a network; (b) encrypting the message with one of a plurality of keys respectively corresponding to a plurality of groups according to a determination result obtained in operation (a), each group comprising one or more devices in the network; and (c) transmitting the encrypted message.

According to another aspect of the present invention, there is provided an apparatus for transmitting a message. The apparatus includes: a message determination unit which determines whether the message is a message for detecting a device in a network, an encryption unit which encrypts the message with one of a plurality of keys respectively corresponding to a plurality of groups, according to a determination result provided by the message determination unit, each group comprising one or more devices in the network, and a transmission unit which transmits the encrypted message.

According to another aspect of the present invention, there is provided a computer-readable recording medium storing a computer program for executing the method of transmitting a message.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings in which exemplary embodiments of the invention are shown.

Figure 1:
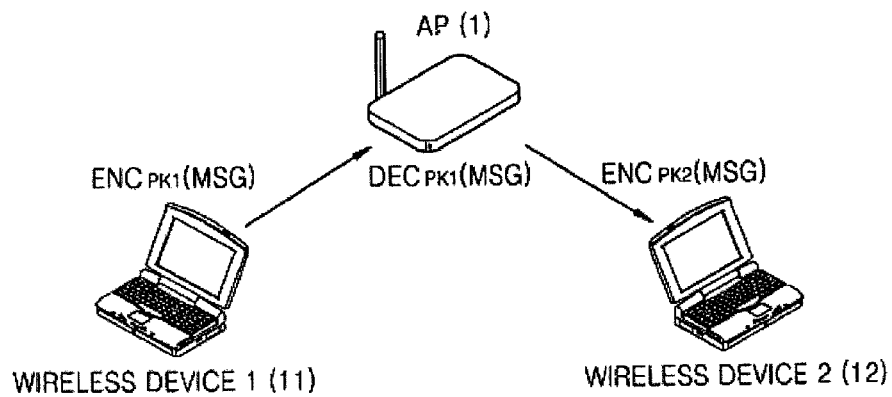
FIG. 1 is a diagram illustrating a related art method of unicasting a message encrypted according to the IEEE 802.11i standard.
Figure 2:
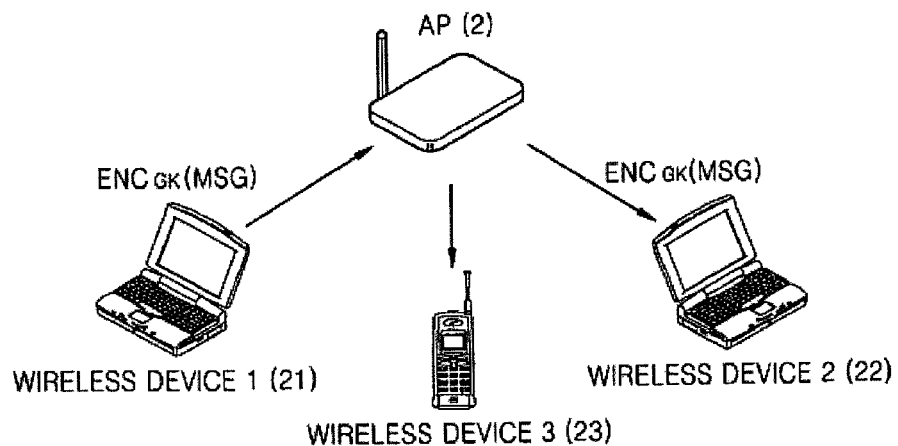
FIG. 2 is a diagram illustrating a related art method of multicasting a message encrypted according to the IEEE 802.11i standard.
Figure 3:
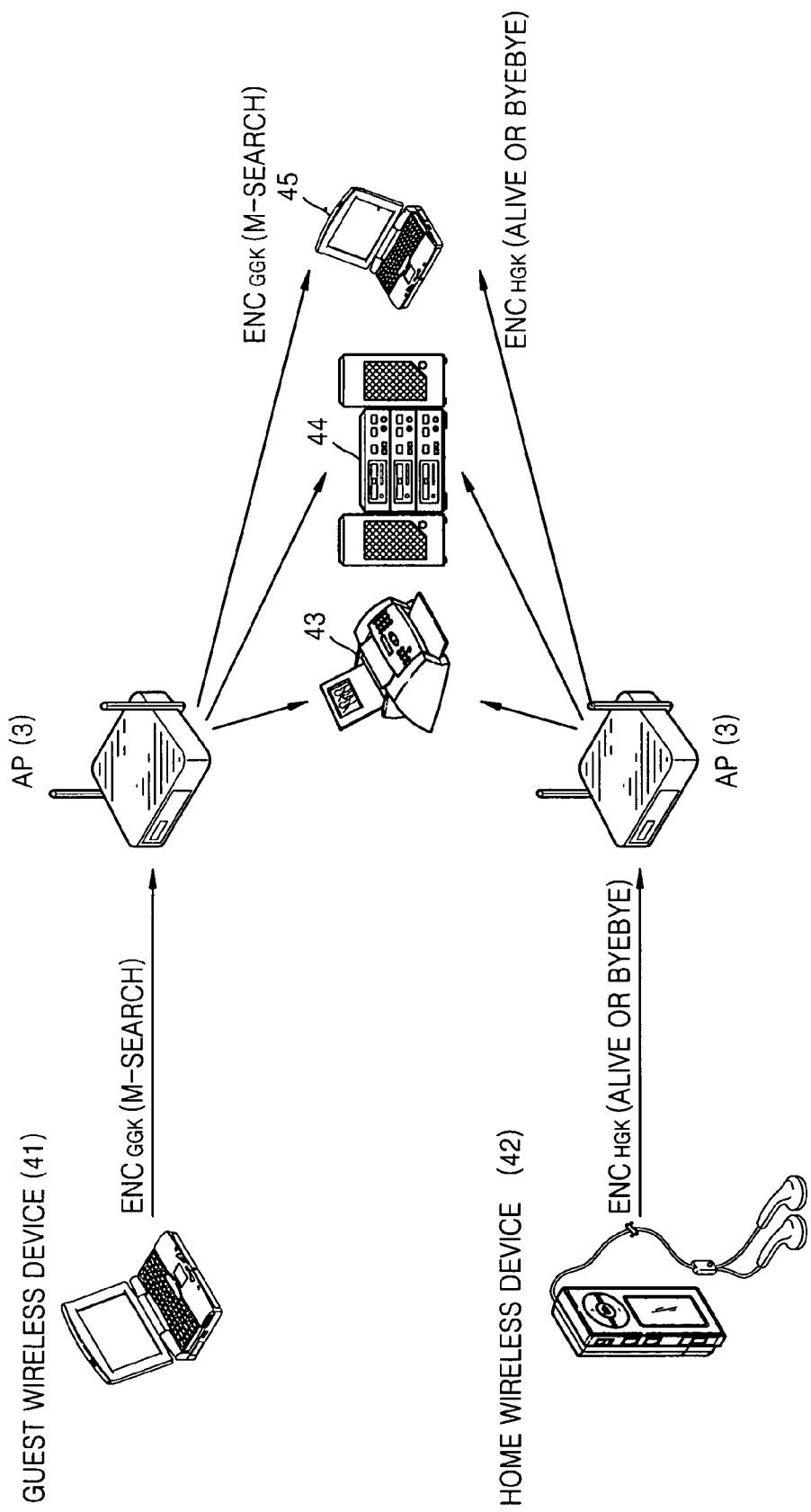
FIG. 3 is a diagram illustrating a wireless home network environment according to an exemplary embodiment of the present invention.

FIG. 3 is a diagram illustrating a wireless home network environment according to an exemplary embodiment of the present invention. Referring to FIG. 3, the wireless home network environment includes a guest wireless device 41, a home wireless device 42, an access point (AP) 3, and wireless devices 44, 45 and 46. Devices that can wirelessly communicate such as mobile phones, portable computers, and personal digital assistants (PDAs) will hereinafter be collectively referred to as wireless devices, and devices that can provide wireless devices with access to a wireless network will hereinafter be referred to as APs.

The guest wireless device 41 is a wireless device visiting a wireless home network and is unknown to a user of the wireless home network. The home wireless device 42 is an existing wireless device in the wireless home network and is well known to the user. The user can classify wireless devices in the wireless home network into a home group including wireless devices well known to the user and a guest group including wireless devices unknown to the user.

According to the Universal Plug and Play (UPnP) standard, the guest wireless device 41 which corresponds to a UPnP control point (CP) can detect the home wireless device 42 in the wireless home network in the following cases. In the first UPnP-based case, the guest wireless device 41 can detect the home wireless device 42 by multicasting an M-search message to actively search for wireless devices in the wireless home network and receiving a response message from the home wireless device 42. In this case, a method of preventing the guest wireless device 41 from detecting the home wireless device 42 according to an exemplary embodiment of the present invention is provided, and this method will be described in detail.

The guest wireless device 41 encrypts an M-search message with a guest group key and transmits the encrypted M-search message. Thereafter, the AP 3 decrypts the encrypted M-search message with the guest group key, thereby restoring the original M-search message. Thereafter, if the AP 3 recognizes that the restored message is the original M-search message, the AP3 encrypts the restored message with the guest group key and transmits the encrypted message. On the other hand, if the AP 3 recognizes that the restored message is not the original M-search message, the AP 3 encrypts the restored message with a home group key and encrypts the restored message with the guest group key, and then transmits both the message encrypted with the home group key and the message encrypted with the guest group key so that all the wireless devices in the wireless home network can receive the encrypted messages transmitted by the AP 3.

In the second UPnP-based case, the home wireless device 42 multicasts an alive message indicating that the home wireless device 42 has just entered the wireless home network or a bye-bye message indicating that the home wireless device 42 has just left the wireless home network, and the guest wireless device 41 detects the home wireless device 42 by receiving either the alive message or the bye-bye message. In this case, a method of preventing the guest wireless device 41 from detecting the home wireless device 42 according to an exemplary embodiment of the present invention is performed, and this method will be described in detail.

The home wireless device 42 encrypts an alive message or a bye-bye message with the home group key and transmits the encrypted message. Then, the AP 3 decrypts the encrypted message transmitted by the home wireless device 42 with the home group key, thereby restoring the original alive message or the original bye-bye message. Thereafter, if the AP 3 recognizes that the restored message is the original alive message or the original bye-bye message, the AP 3 encrypts the restored message with the home group key and transmits the encrypted message. On the other hand, if the AP 3 recognizes that the restored message is not the original alive message or the original bye-bye message, the AP 3 encrypts the restored message with the home group key, encrypts the restored message with the guest group key, and transmits both the message encrypted with the home group key and the message encrypted with the guest group key so that all the wireless devices in the wireless home network can receive the encrypted messages transmitted by the AP 3.

As described above, in the wireless home network environment according to the current exemplary embodiment of the present invention, wireless devices are classified as home wireless devices or guest wireless devices, and the transmission of UPnP messages is controlled according to these classifications. Therefore, it is possible to enhance the security of home wireless devices against guest wireless devices. According to the current exemplary embodiment of the present invention, it is determined whether a wireless device is a home wireless device or a guest wireless device using an IEEE 802.11i-based authentication method.

Figure 4:
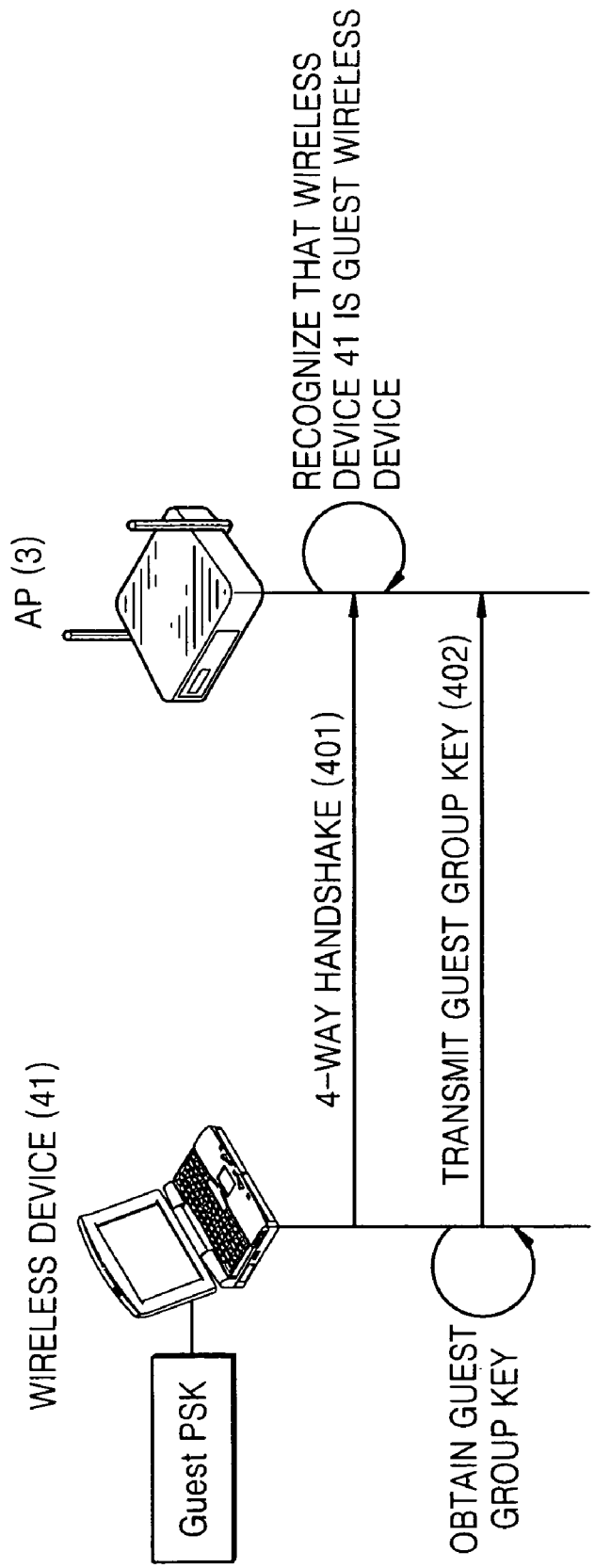
FIG. 4 is a diagram illustrating a method of classifying a plurality of wireless devices into groups according to an exemplary embodiment of the present invention.

FIG. 4 is a diagram illustrating a method of classifying wireless devices according to an exemplary embodiment of the present invention. Referring to FIG. 4, in operation 401, the AP 3 and the wireless device 41 exchange authentication information of the AP 3 and authentication information of the wireless device 41. Thereafter, the AP 3 generates a pairwise key (PK) by combining a pre-shared key (PSK) held by the AP 3, the authentication information of the AP 3, and the authentication information of the wireless device 41, and the wireless device 41 generates a pairwise key by combining a pre-shared key held by the wireless device 41, the authentication information of the AP 3, and the authentication information of the wireless device 41. Then the AP 3 and the wireless device 41 may share the pairwise keys with each other. This type of operation of obtaining pairwise keys is referred to as a four-way handshake operation according to the IEEE 802.11i standard.

According to the current exemplary embodiment of the present invention, a user sets wireless devices well known to the user as home wireless devices by allocating a home pre-shared key to each of the wireless devices well known to the user, and sets wireless devices unknown to the user as guest wireless devices by allocating a guest pre-shared key to each of the wireless devices unknown to the user. Accordingly, each of the home wireless devices holds the home pre-shared key, and each of the guest wireless devices holds the guest pre-shared key.

Since the AP 3 must be able to communicate with both home wireless devices and guest wireless devices, it must hold both the home pre-shared key and the guest pre-shared key. Therefore, the AP 3 performs a four-way handshake operation for the home pre-shared key, and performs a four-way handshake operation for the guest pre-shared key with reference to the results of the four-way handshake operation for the home pre-shared key. The AP 3 can recognize that the wireless device 41 is a guest wireless device based on the results of the four-way handshake operation for the guest pre-shared key.

In operation 402, once a pairwise key that can be shared between the AP 3 and the wireless device 41 is obtained in operation 401, the AP 3 encrypts a guest group key with the pairwise key, and transmits the encrypted guest group key to the wireless device 41. A group key is a key shared only between wireless devices which belong to a certain group in a wireless home network and is used for encrypting a multicast or broadcast message. On the other hand, a pairwise key is a key shared between an AP and a specific wireless device and is used for encrypting a unicast message.

The method illustrated in FIG. 4 can also be applied to the home wireless device 42 of FIG. 3 The AP 3 can recognize that the home wireless device 42 is a home wireless device based on the results of a four-way handshake operation with the home wireless device 42 for the home pre-shared key. Then the AP 3 encrypts a home group key with a pairwise key only shared between the AP 3 and the wireless device 42 and transmits the encrypted home group key to the wireless device 42.

Figure 5:
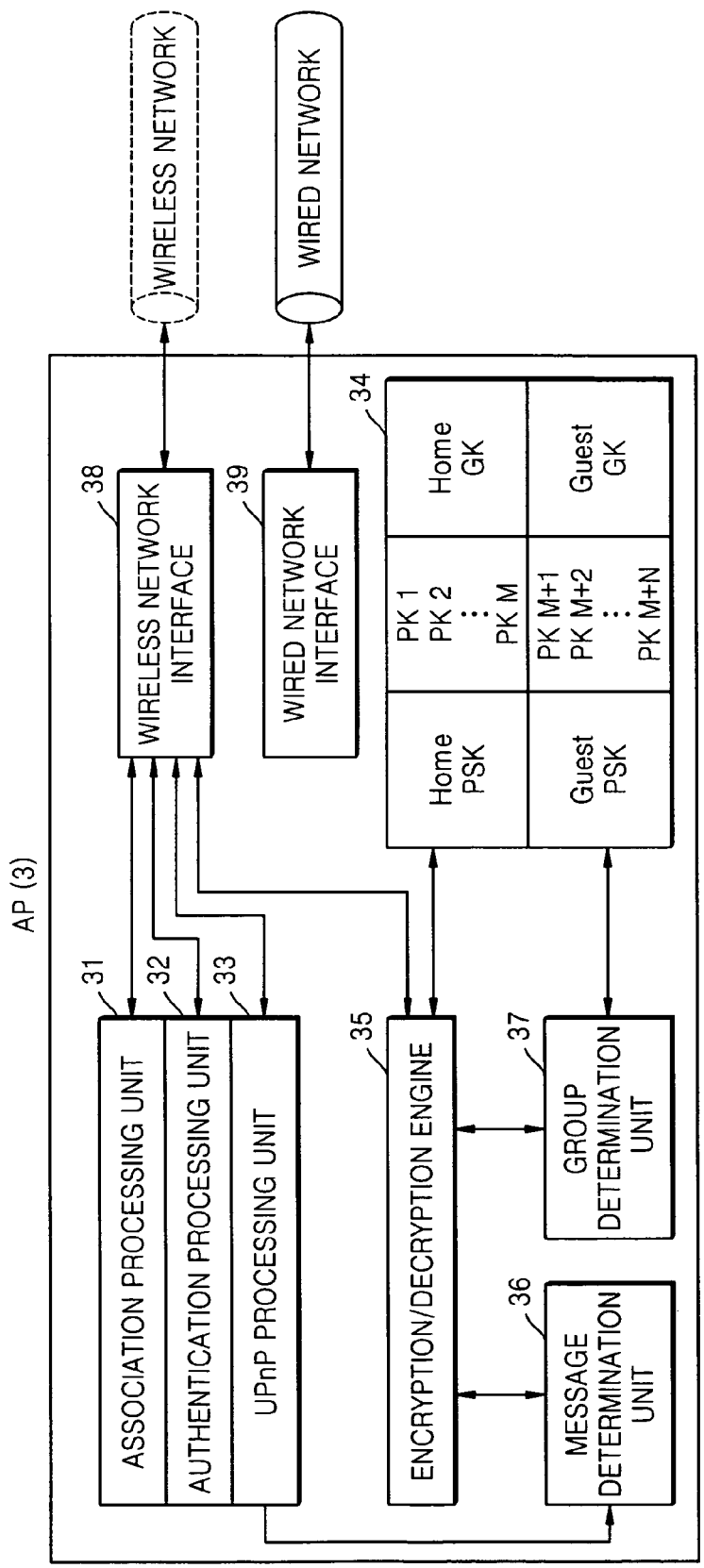
FIG. 5 is a block diagram illustrating the structure of an access point (AP) according to an exemplary embodiment of the present invention.

FIG. 5 is a block diagram illustrating the structure of the AP 3 according to an exemplary embodiment of the present invention. Referring to FIG. 5, the AP 3 includes an association processing unit 31, an authentication processing unit 32, a UPnP processing unit 33, an encryption key table 34, an encryption/decryption engine 35, a message determination unit 36, a group determination unit 37, a wireless network interface 38, and a wired network interface 39. It is obvious to one of ordinary skill in the art to which the present invention pertains that any of the wireless devices 41 through 45 illustrated in FIG. 3 can be applied to the present exemplary embodiment.

The association processing unit 31 performs an association process together with a wireless device according to the IEEE 802.11b standard. The association processing unit 31 corresponds to a link layer. In detail, the association processing unit 31 receives a probe request frame from a wireless device via the wireless network interface 38 and transmits a probe response frame to the wireless device in return. The probe request frame is a frame searching for an AP in a communication range of the wireless device. The probe response frame comprises communication environment information, load information, and security information of the AP 3. The security information of the AP 3 comprises information regarding the management of an authentication key and information on how to encrypt unicast messages and multicast messages.

Thereafter, the association processing unit 31 transmits/receives an authentication frame to/from the wireless device. The authentication frame is only used for the AP 3 and the wireless device to recognize each other. This type of authentication method is referred to as an open authentication method.

Thereafter, the association processing unit 31 receives an association request frame from the wireless device via the wireless network interface 38 and transmits an association response frame to the wireless device in return.

In general, when the wireless device transmits a probe request frame, more than one AP including the AP 3 may respond to the probe request frame. As a result, the wireless device receives a plurality of probe response frames from the respective APs. Thereafter, the wireless device chooses one of the APs which have responded to the probe request frame with reference to communication environment information, load information, and security information of the APs included in the received probe response frames, and transmits an association request frame to a chosen AP. When the wireless device receives an association response frame from the chosen AP, a logical connection is established between the wireless device and the chosen AP so that data can be transmitted between the wireless device and the chosen AP.

The authentication processing unit 32 performs an authentication operation together with the wireless device according to the IEEE 802.11i standard. The authentication processing unit 32 corresponds to a link layer. In detail, the authentication processing unit 32 transmits authentication information of the AP 3 comprising a MAC address of the AP 3 and a random number to a wireless device and receives authentication information of the wireless device comprising a MAC address of the wireless device and another random number.

Thereafter, the authentication processing unit 32 generates a pairwise key which is can be shared between the AP 3 and the wireless device by combining a pre-shared key held by the AP 3, the authentication information of the AP 3, and the authentication information of the wireless device. Thereafter, the authentication processing unit 32 generates a message integrity code (MIC) of the AP 3 using the pairwise key and transmits the MIC of the AP 3 to the wireless device. The wireless device receives the MIC of the AP 3, generates a MIC of the wireless device based on a pairwise key generated by the wireless device, and compares the MIC of the wireless device with the MIC of the AP 3. If the MIC of the wireless device is the same as the MIC of the AP 3, the wireless device transmits a success message indicating that the AP 3 and the wireless device have successfully authenticated each other. The authentication processing unit 32 receives the success message and completes the authentication of the wireless device by determining based on the success message whether the pairwise key generated by the AP 3 and the pairwise key generated by the wireless device are identical.

According to the current exemplary embodiment of the present invention, the AP 3 holds two types of pre-shared keys, i.e., a home pre-shared key and a guest pre-shared key. Therefore, the authentication processing unit 32 must perform both a home pre-shared key-based authentication operation and a guest pre-shared key-based authentication operation. In other words, the authentication processing unit 32 exchanges, with the wireless device, the authentication information of the AP 3 and the authentication information of the wireless device during a home pre-shared key-based authentication operation. Thereafter, the authentication processing unit 32 generates a pairwise key, which can be shared between the AP 3 and the wireless device, by combining the home pre-shared key, the authentication information of the AP 3, and the authentication information of the wireless device. Thereafter, the authentication processing unit 32 generates a MIC of the AP 3 using the pairwise key and transmits the MIC of the AP 3 to the wireless device. Thereafter, when the authentication processing unit 32 receives a success message from the wireless device indicating that the AP 3 and the wireless device have successfully authenticated each other, the authentication processing unit 32 determines whether the pairwise key generated by the AP 3 is identical to a pairwise key generated by the wireless device. If the pairwise key generated by the AP 3 is identical to the pairwise key generated by the wireless device, the authentication processing unit 32 determines the pairwise key generated by the AP 3 to be shared between the AP 3 and the wireless device. In this case, the wireless device is a home wireless device.

If the authentication processing unit 32 receives no success message from the wireless device during the home pre-shared key-based authentication operation, the authentication processing unit 32 exchanges the authentication information of the AP 3 and the authentication information of the wireless device with the wireless device for a guest pre-shared key-based authentication operation. Thereafter, the authentication processing unit 32 generates a pairwise key, which can be shared between the AP 3 and the wireless device, by combining the guest pre-shared key, the authentication information of the AP 3, and the authentication information of the wireless device. Thereafter, the authentication processing unit 32 generates a MIC of the AP 3 using the pairwise key and transmits the MIC of the AP 3 to the wireless device. Thereafter, when the authentication processing unit 32 receives a success message indicating that the AP 3 and the wireless device have successfully authenticated each other from the wireless device via the wireless network interface 38, the authentication processing unit 32 determines whether the pairwise key generated by the AP 3 and the pairwise key generated by the wireless device are identical. If the pairwise key generated by the AP 3 and the pairwise key generated by the wireless device are identical, the authentication processing unit 32 determines the pairwise key generated by the AP 3 to be shared between the AP 3 and the wireless device. In this case, the wireless device is a guest wireless device. If the authentication processing unit 32 receives no success message from the wireless device in the home pre-shared key-based authentication operation or the guest pre-shared key-based authentication operation, the authentication processing unit 32 determines that the AP 3 and the wireless device have failed to authenticate each other.

The authentication processing unit 32 may perform the home pre-shared key-based authentication operation after the guest pre-shared key-based authentication operation.

Once a pairwise key to be shared between the AP 3 and the wireless device is determined, the authentication processing unit 32 encrypts a home group key with the pairwise key and transmits the encrypted result to the wireless device via the wireless network interface 38. According to the current exemplary embodiment of the present invention, wireless devices in a wireless home network are classified into a home group including home wireless devices or a guest group including guest wireless devices. Therefore, the authentication processing unit 32 encrypts the home group key with a home pre-shared key-based pairwise key and transmits the encrypted result to the wireless device via the wireless network interface 38. If the wireless device belongs to the home group and thus holds the home pre-shared key-based pairwise key, it can decrypt the home group key encrypted with the home pre-shared key-based pairwise key, thereby restoring the home group key.

The authentication processing unit 32 encrypts a guest group key with a guest pre-shared key-based pairwise key and transmits the encrypted result to the wireless device via the wireless network interface 38. If the wireless device belongs to the guest group and thus holds the guest pre-shared key-based pairwise key, it can decrypt the guest group key encrypted with the guest pre-shared key-based pairwise key, thereby restoring the guest group key. In this manner, wireless devices which hold the home pre-shared key-based pairwise key can obtain the home group key, and wireless devices which hold the guest pre-shared key-based pairwise key can obtain the guest group key.

The aforementioned authentication method is based on the Wi-Fi Protected Access-Preshared Key standard which is a version of the IEEE 802.11i standard for home networks or small office/home office (SOHO) environments. However, the present invention is not restricted to this. That is, the present invention can also be applied to, for example, an IEEE 802.1X-based authentication method.

The UPnP processing unit 33 processes the communication of the AP 3 with the wireless device according to the UPnP standard. The UPnP processing unit 33 corresponds to an application layer. The AP 3 serves as a UPnP-based control point. In detail, the UPnP processing unit 33 performs an addressing operation to allocate an IP address to the AP 3. Once the IP address of the AP 3 is determined, the UPnP processing unit 33 performs a discovery operation to detect a wireless device in a wireless home network. If a wireless device is detected in the wireless home network, the UPnP processing unit 33 performs a description operation to obtain a description of the detected wireless device. Thereafter, the UPnP processing unit 33 performs a control operation to control the detected wireless device with reference to the description of the detected wireless device. The UPnP processing unit 33 performs an event operation to obtain information about changes to the state of the detected wireless device caused by the control operation.

In other words, if the AP 3 newly enters the wireless home network, the UPnP processing unit 33 multicasts an M-search message to dynamically search for wireless devices in the wireless home network. If a wireless device newly enters the wireless home network, the UPnP processing unit 33 receives an alive message indicating that the wireless device has entered the wireless home network. If a wireless device leaves the wireless home network, the UPnP processing unit 33 receives a bye-bye message indicating that the wireless device has left the wireless home network.

The encryption key table 34 stores a home pre-shared key, a guest pre-shared key, a plurality of pairwise keys, a home group key, and a guest group key. Referring to FIG. 5, the encryption key table 34 stores the home pre-shared key, the guest pre-shared key, the plurality of pairwise keys, the home group key, and the guest group key in such a manner that the home pre-shared key is mapped to a plurality of pairwise keys that are generated based on the home pre-shared key and that the guest pre-shared key is mapped to a plurality of pairwise keys that are generated based on the guest pre-shared keys. Therefore, it is possible to determine by evaluating a pairwise key used by a wireless device whether a pre-shared key, used to generate the pairwise key, is a home pre-shared key or a guest pre-shared key and whether a group key of the wireless device is a home group key or a guest group key.

The encryption/decryption engine 35 retrieves an original message transmitted by a wireless device by decrypting an encrypted message received via the wireless network interface 38. In detail, if the message determination unit 36 determines that an encrypted message received via the wireless network interface 38 is a unicast message, the encryption/decryption engine 35 reads from the encryption key table 34 a pairwise key corresponding to a wireless device which has transmitted the encrypted message and decrypts the encrypted message with the pairwise key, thereby restoring the original message.

In addition, the encryption/decryption engine 35 reads from the encryption key table 34 a pairwise key corresponding to a destination wireless device for which the restored message is destined, encrypts the restored message with the pairwise key, and transmits the encrypted result to the destination wireless device via the wireless network interface 38.

If the message determination unit 36 determines the encrypted message as being a multicast message, the encryption/decryption engine 35 reads a home group key or a guest group key from the encryption key table 34 and decrypts the encrypted message with the home group key or the guest group key, thereby restoring the original message. If the wireless device which has transmitted the encrypted message is a home wireless device, the AP 3 can decrypt the encrypted message with the home group key. On the other hand, if the wireless device which has sent the encrypted message is a guest wireless device, the AP 3 can decrypt the encrypted message with the guest group key.

The encryption/decryption engine 35 encrypts the restored message with a group key corresponding to at least one group of wireless devices in the wireless home network with reference to the determination results provided by the message determination unit 36 and the group determination unit 37. According to the current exemplary embodiment of the present invention, the encryption/decryption engine 35 may encrypt the restored message with either the home group key, which corresponds to a home group including home wireless devices, or the guest group key, which corresponds to a guest group including guest wireless devices.

In detail, if the message determination unit 36 determines the restored message as being an M-search message, the group determination unit 37 determines which group the wireless device that transmitted the restored M-search message is included in. Then the encryption/decryption engine 35 reads from the encryption key table 34 a group key corresponding to the determined group of the wireless device. Then the encryption/decryption engine 35 encrypts the restored M-search message with the corresponding group key. For example, according to the current exemplary embodiment of the present invention, if the message determination unit 36 determines the restored message as being an M-search message and the group determination unit 37 determines the restored M-search message as being from a wireless device which is included in the guest group, then the encryption/decryption engine 35 may read a guest group key from the encryption key table 34. Then the encryption/decryption engine 35 encrypts the restored M-search message with the guest group key.

If the message determination unit 36 determines the restored message as being an alive message or a bye-bye message, the group determination unit 37 determines which group the wireless device that sent the restored alive or bye-bye message is included in, then the encryption/decryption engine 35 reads from the encryption key table 34 a group key corresponding to the determined group of the wireless device. Then the encryption/decryption engine 35 encrypts the restored alive or bye-bye message with the corresponding group key. For example, according to the current exemplary embodiment of the present invention, if the message determination unit 36 determines the restored message as being an alive message or a bye-bye message and the group determination unit 37 determines the restored alive or bye-bye message as being from a wireless device which is included in the home group, then the encryption/decryption engine 35 may read a home group key from the encryption key table 34. Then the encryption/decryption engine 35 encrypts the restored alive or bye-bye message with the home group key.

If the message determination unit 36 determines the restored message as not being a message used to find a wireless device in the wireless home network, i.e., if the message determination unit 36 determines the restored message as not being any of ani M-search message, an alive message, and a bye-bye message, the encryption/decryption engine 35 encrypts the restored message with a plurality of group keys respectively corresponding to a plurality of groups into which all the wireless devices in the wireless home network are classified, thereby generating a plurality of encrypted messages. For example, according to the current exemplary embodiment of the present invention, If the message determination unit 36 determines the restored message as not being a message used to detect a wireless device in the wireless home network, i.e., if the message determination unit 36 determines the restored message as not being any of an M-search message, an alive message, and a bye-bye message, the encryption/decryption engine 35 may encrypt the restored message with a home group key corresponding to a home group and a guest group key corresponding to a guest group, thereby generating a home group key encrypted message and a guest group key encrypted message.

The message determination unit 36 determines whether an encrypted message received via the wireless network interface 38 is a unicast message or a multicast message. In detail, the message determination unit 36 determines whether the encrypted message received via the wireless network interface 38 is a unicast message or a multicast message by determining whether an address recorded in an address field of a header of the encrypted message is a UPnP unicast address or a UPnP multicast address.

In addition, the message determination unit 36 determines whether a restored message provided by the encryption/decryption engine 35 is a message used to detect a wireless device in the wireless home network. In detail, if the group determination unit 37 determines a wireless device that has transmitted a restored message provided by the encryption/decryption engine 35 belongs to a guest group, the message determination unit 36 determines whether the restored message is an M-search message. On the other hand, if the group determination unit 37 determines that the wireless device which has sent the restored message belongs to a home group, the message determination unit 36 determines whether the restored message is an alive message or a bye-bye message.

The group determination unit 37 determines to which of a plurality of groups including one or more wireless devices the wireless device that has transmitted the restored message belongs. In detail, the group determination unit 37 can determine to which of the groups the wireless device that has transmitted the restored message belongs by determining to which of the groups a group key used by the encryption/decryption engine 35 to obtain the restored message corresponds. For example, according to the current exemplary embodiment of the present invention, the group determination unit 37 can determine whether the wireless device that has transmitted the restored message belongs to a home group including home wireless devices or a guest group including guest wireless devices by determining whether the group key used by the encryption/decryption engine 35 to obtain the restored message is a home group key or a guest group key.

The wireless network interface 38 receives a data frame from a wireless network and outputs the data frame to the association processing unit 31, the authentication processing unit 32, the UPnP processing unit 33, the encryption/decryption engine 35, or the message determination unit 36. In detail, when the wireless network interface 38 receives a probe request frame, an authentication frame, or an association request frame from the wireless network, the wireless network interface 38 transmits the received frame to the association processing unit 31. When the wireless network interface 38 receives authentication information of a wireless device or a success message from a wireless device from the wireless network, it transmits the authentication information or the success message to the authentication processing unit 32. When the wireless network interface 38 receives an alive message or a bye-bye message from the wireless network, it transmits the received message to the UPnP processing unit 33. When the wireless network interface 38 receives a pairwise key of a wireless device or a message encrypted with a group key from the wireless network, it transmits the received pairwise key or the received message to the encryption/decryption engine 35 and the message determination unit 36.

The wireless network interface 38 can receive data frames from the association processing unit 31, the authentication processing unit 32, the UPnP processing unit 33, or the encryption/decryption engine 35 and transmit the data frames to the wireless network. In detail, when the wireless network interface 38 receives a probe response frame, an authentication frame, or an association response frame from the association processing unit 31, it transmits the received frame to the wireless network. When the wireless network interface 38 receives authentication information, a pairwise key, and a group key of the AP 3 from the authentication processing unit 32, it transmits the received authentication information, the received pairwise key, or the received group key to the wireless network. When the wireless network interface 38 receives an M-search message from the UPnP processing unit 33, it transmits the received M-search message to the wireless network. When the wireless network interface 38 receives an encrypted message from the encryption/decryption engine 35, it transmits the received encrypted message to the wireless network.

The wired network interface 39 receives/transmits a data frame from/to a wired network. In general, the AP 3 not only can mediate communication between wireless devices but can also connect the wireless devices to a wired network. The AP 3 can connect the wireless devices to a wired network using a conventional method, and therefore a description of how the AP 3 processes a data frame received from a wired network will be omitted.

Figure 6A:
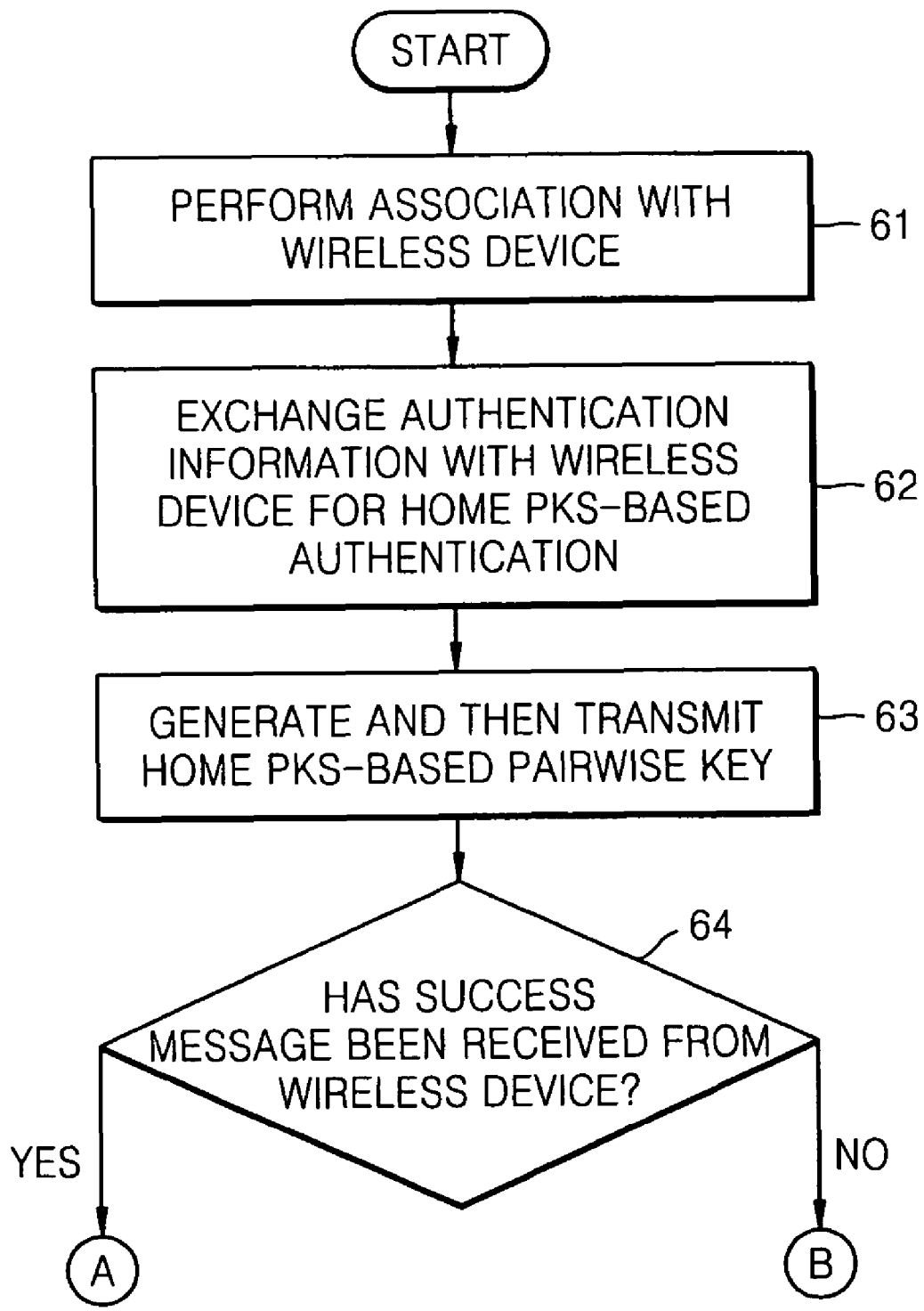
FIGS. 6A and 6B show a flowchart illustrating a method of providing an encryption key according to an exemplary embodiment of the present invention.
Figure 6B:
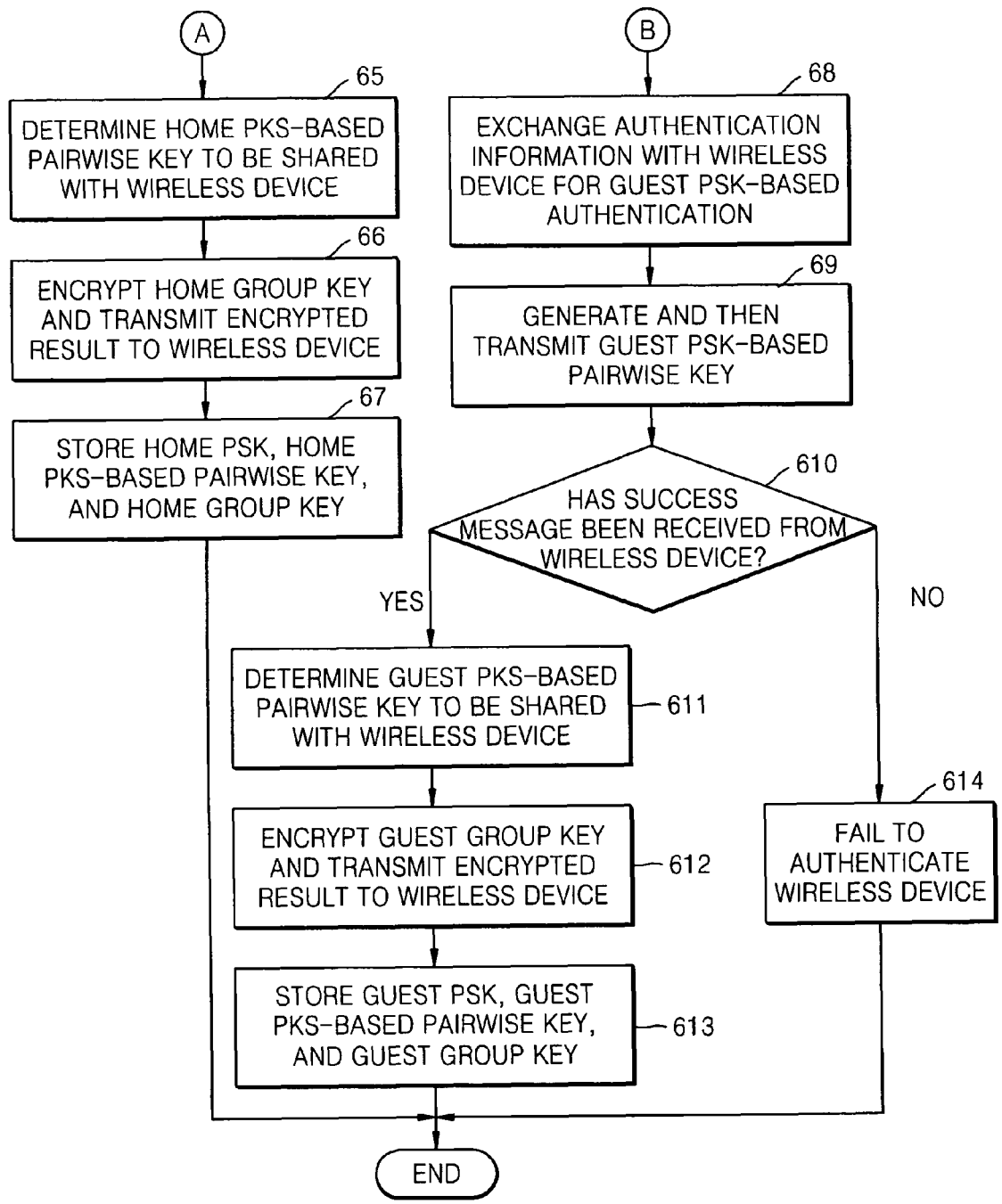

FIG. 6 is a flowchart illustrating a method of providing an encryption key according to an exemplary embodiment of the present invention. The method illustrated in FIG. 6 comprises operations performed by the AP 3 illustrated in FIG. 5, and thus, the description of the AP 3 presented above with reference to FIG. 5 can be directly applied to the method illustrated in FIG. 6.

Referring to FIG. 6, in operation 61, the AP 3 performs association with a wireless device.

In operation 62, the AP 3 exchanges authentication information of the AP 3 and authentication information of the wireless device with the wireless device for a home pre-shared key-based authentication operation.

In operation 63, the AP 3 generates a home pre-shared key-based pairwise key, which can be shared between the AP 3 and the wireless device, by combining a home pre-shared key, the authentication information of the AP 3, and the authentication information of the wireless device. In addition, in operation 63, the AP 3 generates a MIC of the AP 3 based on the home pre-shared key-based pairwise key and transmits the MIC of the AP 3 to the wireless device.

In operation 64, if the AP 3 receives a success message from the wireless device indicating that the AP 3 and the wireless device have successfully authenticated each other, the method proceeds to operation 65. Otherwise, the method proceeds to operation 68.

In operation 65, the AP 3 determines the home pre-shared key-based pairwise key to be shared between the AP 3 and the wireless device.

In operation 66, the AP 3 encrypts a home group key with the home pre-shared key-based pairwise key and transmits the encrypted result to the wireless device.

In operation 67, the AP 3 stores the home pre-shared key, the home pre-shared key-based pairwise key, and the home group key.

In operation 68, the AP 3 exchanges the authentication information of the AP 3 and the authentication information of the wireless device with the wireless device for a guest pre-shared key-based authentication operation.

In operation 69, the AP 3 generates a guest pre-shared key-based pairwise key by combining a guest pre-shared key, the authentication information of the AP 3, and the authentication information of the wireless device. In addition, in operation 69, the AP 3 generates MIC of the AP 3 based on the guest pre-shared key based pairwise key and transmits the MIC of the AP 3 to the wireless device.

In operation 610, if the AP 3 receives a success message from the wireless device indicating that the AP 3 and the wireless device have successfully authenticated each other, the method proceeds to operation 61 1. Otherwise, the method proceeds to operation 614.

In operation 611, the AP 3 determines the guest pre-shared key-based pairwise key to be shared between the AP 3 and the wireless device.

In operation 612, the AP 3 encrypts a guest group key with the guest pre-shared key-based pairwise key and transmits the encrypted result to the wireless device.

In operation 613, the AP 3 stores the guest pre-shared key, the guest pre-shard key-based pairwise key, and the guest group key.

In operation 614, the AP 3 determines that the AP 3 and the wireless device have failed to authenticate each other.

Figure 7A:
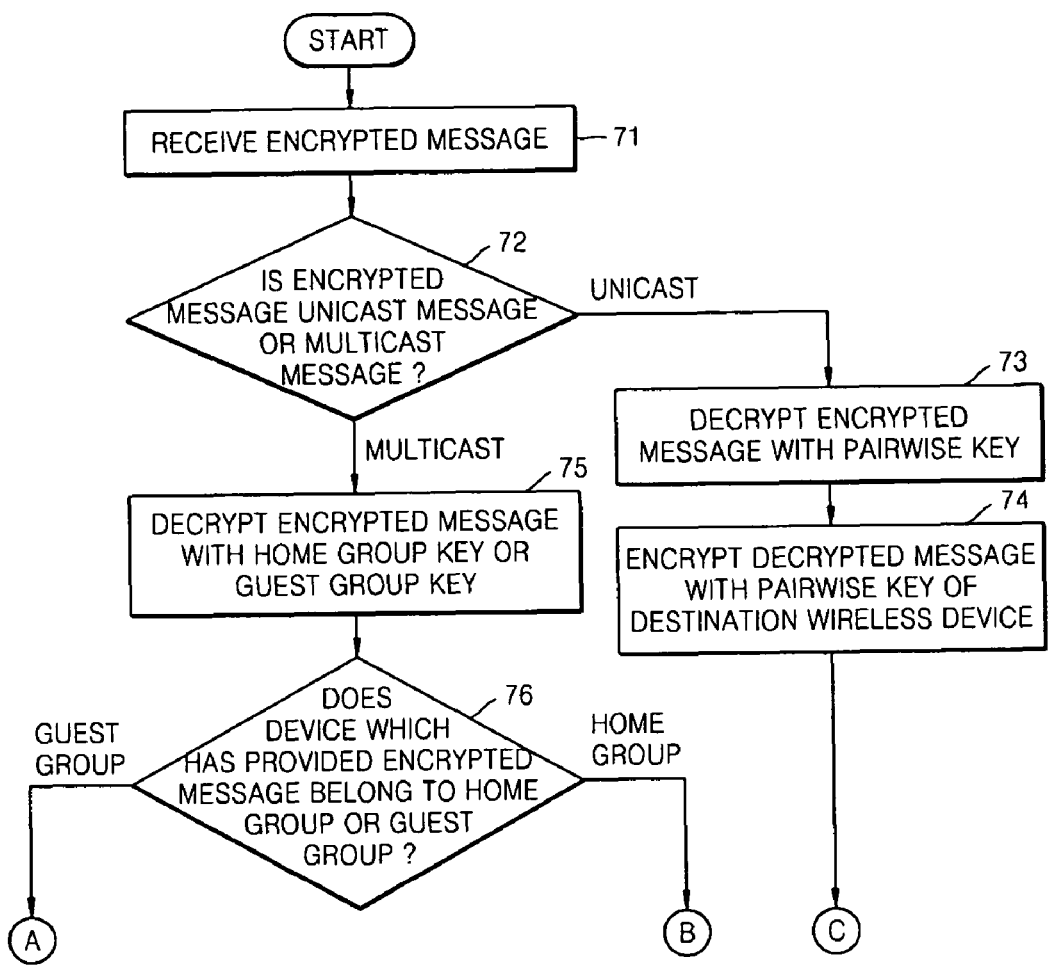
FIGS. 7A and 7B show a flowchart illustrating a method of transmitting a message according to an exemplary embodiment of the present invention.
Figure 7B:
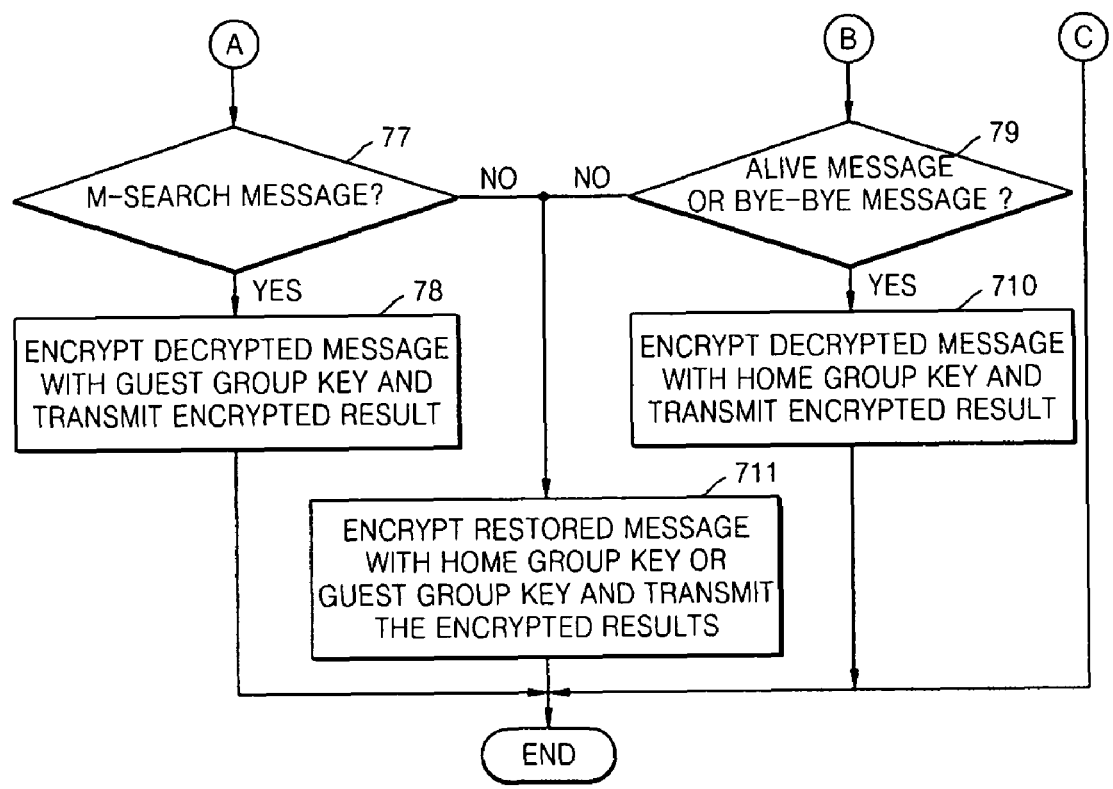

FIG. 7 is a flowchart illustrating a method of transmitting a message according to an exemplary embodiment of the present invention. The method illustrated in FIG. 7 comprises operations performed by the AP 3 illustrated in FIG. 3, and thus, the description of the AP 3 presented above with reference to FIG. 5 can be directly applied to the method illustrated in FIG. 7.

Referring to FIG. 7, in operation 71, the AP 3 receives an encrypted message.

In operation 72, the AP 3 determines whether the encrypted message is a unicast message or a multicast message. If the encrypted message is determined in operation 72 to be a unicast message, the method proceeds to operation 73. On the other hand, if the encrypted message is determined in operation 72 to be a multicast message, the method proceeds to operation 75.

In operation 73, the AP 3 decrypts the encrypted message with a pairwise key corresponding to a wireless device that has sent the encrypted message, thereby restoring the original message.

In operation 74, the AP 3 encrypts the restored message obtained in operation 73 with a pairwise key corresponding to a destination wireless device for which the restored message is destined and transmits the encrypted result.

In operation 75, the AP 3 decrypts the encrypted message with a home group key or a guest group key, thereby restoring the original message.

In operation 76, the AP 3 determines whether the wireless device that has sent the encrypted message belongs to a guest group or a home group. If the wireless device that has sent the encrypted message is determined in operation 76 to belong to a guest group, the method proceeds to operation 77. If the wireless device that has sent the encrypted message is determined in operation 76 to belong to a home group, the method proceeds to operation 79.

In operation 77, the AP 3 determines whether the restored message obtained in operation 75 is an M-search message. If the restored message obtained in operation 75 is determined in operation 77 as being an M-search message, the method proceeds to operation 78. Otherwise, the method proceeds to operation 711.

In operation 78, the AP 3 encrypts the restored message obtained in operation 75 with a guest group key corresponding to the guest group to which the wireless device which has sent the encrypted message belongs, and transmits the encrypted result.

In operation 79, the AP 3 determines whether the restored message obtained in operation 75 is an alive message or a bye-bye message or not. If the restored message obtained in operation 75 is determined in operation 79 as being an alive message or a bye-bye message, the method proceeds to operation 710. If it is determined that the restored message is neither an alive nor a bye-bye message, the method proceeds to operation 711.

In operation 710, the AP 3 encrypts the restored message obtained in operation 75 with a home group key corresponding to the home group to which the wireless device which has transmitted the encrypted message belongs, and transmits the encrypted result.

In operation 711, the AP 3 encrypts the restored message obtained in operation 75 with the home group key, transmits the message encrypted with the home group key, encrypts the restored message obtained in operation 75 with the guest group key, and transmits the message encrypted with the guest group key.

The exemplary embodiments of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

According to the exemplary embodiments of the present invention, it is possible to prevent a guest wireless device, which is unknown to a user, from detecting a home wireless device of the user without authorization of the user by encrypting a message (e.g., an M-search message, an alive message, or a bye-bye message) for detecting a wireless device in a wireless home network of the user with a group key corresponding to a group to which the wireless device that has transmitted the message belongs, and transmitting the encrypted message during a UPnP-based discovery operation. Therefore, it is possible to enhance the security of the home wireless device of the user against guest wireless devices which are unknown to the user of the wireless home network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting a message comprising operations of:
   (a) determining whether the message is a message for detecting a first device in a network;
   (b) encrypting the message with one of a plurality of group keys respectively corresponding to a plurality of groups according to a determination result obtained in operation (a), each group comprising one or more devices in the network; and
   (c) transmitting the encrypted message,
   wherein operation (b) comprises, if the message is determined in operation (a) as being a message for detecting the first device in the network, encrypting the message with one of the plurality of group keys, and if the message is determined in operation (a) as not being a message for detecting the first device in the network, encrypting the message with the plurality of group keys.

2. The method of claim 1 further comprising operation (d) determining to which of the plurality of groups a second device that has provided the message belongs,
   wherein operation (b) comprises encrypting the message according to the determination result obtained in (a) and a determination result obtained in (d).

3. The method of claim 2 further comprising:
   receiving the message, which is an encrypted message, from the network; and
   decrypting the encrypted message, thereby restoring an original message,
   wherein operation (d) comprises determining which of the plurality of group keys has been used to decrypt the encrypted message.

4. The method of claim 2, wherein operation (b) comprises, if the message is determined in operation (a) as being a message for dynamically searching for the first device in the network, encrypting the message with a group key corresponding to a group which is determined in operation (d) as comprising the second device that has provided the message.

5. The method of claim 4, wherein the message for dynamically searching for the first device in the network is a Universal Plug and Play (UPnP)-based M-search message.

6. The method of claim 2, wherein operation (b) comprises, if the message is determined in operation (a) as being a message indicating that the second device has newly entered the network or a message indicating that the second device has left the network, encrypting the message with a group key corresponding to a group which is determined in operation (d) as comprising the second device which has provided the message belongs.

7. The method of claim 6, wherein the message that the second device has newly entered the network is a UPnP-based alive message, and the message indicating that the second device has left the network is a Universal Plug and Play (UPnP)-based bye-bye message.

8. The method of claim 1, wherein operation (b) comprises, if the message is determined in operation (a) as not being a message for dynamically searching for the first device in the network, encrypting the message with the plurality of group keys, thereby generating a plurality of encrypted messages.

9. The method of claim 1, wherein operation (b) comprises, if the message is determined in operation (a) as not being a message indicating that a second device has newly entered the network or a message indicating that the second device has left the network, encrypting the message with the plurality of group keys, thereby generating a plurality of encrypted messages.

10. The method of claim 1, wherein operation (b) comprises, if the message is determined in operation (a) as not being one of a message for dynamically searching for the first device in the network, a message indicating that a second device has newly entered the network and a message indicating that the second device has left the network, encrypting the message with the plurality of group keys, thereby generating a plurality of encrypted messages.

11. An apparatus for transmitting a message comprising:
a message determination unit which determines whether the message is a message for detecting a first device in a network;
an encryption unit which encrypts the message with one of a plurality of group keys respectively corresponding to a plurality of groups, according to a determination result provided by the message determination unit, each group comprising one or more devices in the network; and
a transmission unit which transmits the encrypted message,
wherein operation (b) comprises, if the message determination unit determines the message as being a message for detecting the first device in the network, the encryption unit encrypts the message with one of the plurality of group keys, and if the message determination unit determines the message as not being a message for detecting the first device in the network, the encryption unit encrypts the message with the plurality of group keys.

12. The apparatus of claim 11 further comprising a group determination unit which determines to which of the plurality of groups a second device that has provided the message belongs,
wherein the encryption unit encrypts the message according to the determination result provided by the message determination unit and a determination result provided by the group determination unit.

13. The apparatus of claim 12 further comprising:
a reception unit which receives the message, which is an encrypted message, from the network; and
a decryption unit which decrypts the encrypted message received by the reception unit, thereby restoring an original message,
wherein the group determination unit determines which of the plurality of group keys has been used by the decryption unit to decrypt the encrypted message.

14. The apparatus of claim 12, wherein, if the message determination unit determines the message as being a message for dynamically searching for the first device in the network, the encryption unit encrypts the message with a group key corresponding to a group determined by the group determination unit as comprising the second device that has provided the message.

15. The apparatus of claim 14, wherein the message for dynamically searching for the first device in the network is a Universal Plug and Play (UPnP)-based M-search message.

16. The apparatus of claim 12, wherein, if the message determination unit determines the message as being a message indicating that a device has newly entered the network or a message indicating that the second device has left the network, the encryption unit encrypts the message with a group key corresponding to a group determined by the group determination unit as comprising the second device that has provided the message.

17. The apparatus of claim 16, wherein the message that the second device has newly entered the network is a UPnP-based alive message, and the message indicating that the second device has left the network is a Universal Plug and Play (UPnP)-based bye-bye message.

18. The apparatus of claim 11, wherein, if the message determination unit determines the message as not being a message for dynamically searching for the first device in the network, the encryption unit encrypts the message with the plurality of group keys, thereby generating a plurality of encrypted messages.

19. The apparatus of claim 11, wherein, if the message determination unit determines the message as not being a message indicating that a second device has newly entered the network or a message indicating that the second device has left the network, the encryption unit encrypts the message with the plurality of group keys, thereby generating a plurality of encrypted messages.

20. The apparatus of claim 11, wherein, if the message determination unit determines the message as not being one of a message for dynamically searching for the first device in the network, a message indicating that a second device has newly entered the network and a message indicating that the second device has left the network, the encryption unit encrypts the message with the plurality of group keys, thereby generating a plurality of encrypted messages.

21. A computer-readable non-transitory recording medium storing a computer program for executing a method of transmitting a message comprising operations of:
(a) determining whether the message is a message for detecting a first device in a network;
(b) encrypting the message with one of a plurality of group keys respectively corresponding to a plurality of groups according to a determination result obtained in operation (a), each group comprising one or more devices in the network; and
(c) transmitting the encrypted message
wherein operation (b) comprises, if the message is determined in operation (a) as being a message for detecting the first device in the network, encrypting the message with one of the plurality of group keys, and if the message is determined in operation (a) as not being a message for detecting the first device in the network, encrypting the message with the plurality of group keys.

* * * * *